United States Patent
Liu

(10) Patent No.: US 12,158,667 B2
(45) Date of Patent: Dec. 3, 2024

(54) LIQUID CRYSTAL DISPLAY PANEL

(71) Applicant: TCL CHINA STAR OPTOELECTRONICS TECHNOLOGY CO., LTD., Guangdong (CN)

(72) Inventor: Jing Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,094

(22) PCT Filed: Dec. 22, 2021

(86) PCT No.: PCT/CN2021/140354
§ 371 (c)(1),
(2) Date: Dec. 27, 2021

(87) PCT Pub. No.: WO2023/103089
PCT Pub. Date: Jun. 15, 2023

(65) Prior Publication Data
US 2024/0045279 A1      Feb. 8, 2024

(30) Foreign Application Priority Data
Dec. 10, 2021 (CN) .......................... 202111509903.9

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01)

(58) Field of Classification Search
CPC ................ G02F 1/134309; G02F 1/133707
See application file for complete search history.

(56) References Cited

U.S. PATENT DOCUMENTS

2001/0020993 A1* 9/2001 Watanabe ......... G02F 1/133753
349/129
2004/0032551 A1* 2/2004 Hashimoto ....... G02F 1/133553
349/113
(Continued)

FOREIGN PATENT DOCUMENTS

| CN | 101387798 A | 3/2009 |
| CN | 101750800 A | 6/2010 |

(Continued)

OTHER PUBLICATIONS

International Search Report in International application No. PCT/CN2021/140354, mailed on May 31, 2022.
(Continued)

*Primary Examiner* — Lucy P Chien
(74) *Attorney, Agent, or Firm* — PV IP PC; Wei Te Chung

(57) ABSTRACT

The liquid crystal display panel disclosed in the present application includes a first substrate; a second substrate disposed opposite to the first substrate; and a liquid crystal layer disposed between the first substrate and the second substrate, wherein the first substrate includes a common electrode; the second substrate includes a plurality of first regions defined at intervals in a row direction, a plurality of second regions defined at intervals in a column direction, and a plurality of pixel regions defined by intersection of the plurality of the first regions and the plurality of the second regions; the first regions and/or the second regions are provided with opposite electrodes, so that the liquid crystal molecules located in the first regions and/or the second regions are in a stationary state, thereby improving response times of liquid crystal molecules.

16 Claims, 8 Drawing Sheets

(56) References Cited

U.S. PATENT DOCUMENTS

| | | | |
|---|---|---|---|
| 2005/0243248 A1* | 11/2005 | Yoon | ............... G02F 1/133707 |
| | | | 349/106 |
| 2015/0022767 A1 | 1/2015 | Han et al. | |
| 2017/0285410 A1 | 10/2017 | Kobayashi et al. | |
| 2017/0299908 A1* | 10/2017 | Peng | ............... G02F 1/13338 |

FOREIGN PATENT DOCUMENTS

| | | | |
|---|---|---|---|
| CN | 101881911 A | 11/2010 |
| CN | 102116972 A | 7/2011 |
| CN | 102422210 A | 4/2012 |
| CN | 104460137 A | 3/2015 |
| CN | 104730785 A | 6/2015 |
| CN | 105917271 A | 8/2016 |
| CN | 108803151 A | 11/2018 |
| CN | 110221496 A | 9/2019 |
| CN | 111208676 A | 5/2020 |
| CN | 111679518 A | 9/2020 |
| CN | 112327545 A | 2/2021 |
| CN | 112904630 A | 6/2021 |
| JP | 2019184638 A | 10/2019 |

OTHER PUBLICATIONS

Written Opinion of the International Search Authority in International application No. PCT/CN2021/140354, mailed on May 31, 2022.

Chinese Office Action issued in corresponding Chinese Patent Application No. 202111509903.9 dated Dec. 2, 2022, pp. 1-7.

* cited by examiner

LIQUID CRYSTAL DISPLAY PANEL

BACKGROUND OF INVENTION

Field of Invention

The present application relates to a field of display technology, in particular to a liquid crystal display panel.

Description of Prior Art

In a cross-sectional structure of a certain part of the liquid crystal display panel, from top to bottom, an upper polarizer, a color filter substrate, a liquid crystal layer, an array substrate, and a lower polarizer are provided. The color filter substrate and the array substrate are spaced apart from each other by a certain distance, and a plurality of electrodes on the two substrates are directly opposite to each other. The liquid crystal molecules are sandwiched between the color filter substrate and the array substrate. When an image is displayed, an electric field is formed between a driving voltage loaded on a pixel electrode and a common electrode voltage loaded on the common electrode, and the liquid crystal molecules will be deflected under an action of the electric field. Different degrees of deflection result in different transmittances, so as to realize image display.

Since the liquid crystal display panel does not emit light on its own as described above, it needs a light source for image display. Therefore, the liquid crystal display panel has a backlight source located behind the liquid crystal panel. The light emitted by the backlight passes through a lower polarizer and becomes polarized light with a certain polarization direction. Through a twisting action of the liquid crystal molecules, light brightness of the liquid crystal display panel can be controlled, thereby controlling the brightness of a screen of the thin film transistor liquid crystal display panel. The driving voltage is applied to the liquid crystal molecules to control the twisting of the liquid crystal molecules. Different intensities of the electric field result in different deflection angles of the liquid crystal molecules, so that intensities of the transmitted light are different, and display brightness is also different. A combination of different light intensities of three primary colors, red, green, and blue, can provide desired color display. However, when the traditional vertical alignment type liquid crystal display is in an off state, the liquid crystal molecules return to their initial state under an action of an anchoring force of an alignment layer, but a restore speed of the liquid crystal molecules is too slow, which is likely to cause a tailing phenomenon. As a refresh rate and resolution of liquid crystal display panels become higher and higher, a response time of liquid crystals also needs to be improved accordingly.

In view of above, the existing technology needs to be improved.

SUMMARY OF INVENTION

The present application provides a liquid crystal display panel to improve the response times of the liquid crystals.

In a first aspect, the present application provides a liquid crystal display panel, which includes:
a first substrate;
a second substrate disposed opposite to the first substrate; and
a liquid crystal layer disposed between the first substrate and the second substrate, wherein the first substrate includes a common electrode; the second substrate includes a plurality of first regions defined at intervals in a row direction, a plurality of second regions defined at intervals in a column direction, and a plurality of pixel regions defined by intersection of the plurality of the first regions and the plurality of the second regions; the first regions and/or the second regions are provided with opposite electrodes, and the opposite electrodes are disposed opposite to and electrically connected to the common electrode; and wherein the first substrate is a color filter substrate, and the second substrate is an array substrate.

Optionally, in some embodiments of the present application, pixel electrodes are disposed on the pixel regions, and the opposite electrodes and the pixel electrodes are disposed in a same layer.

Optionally, in some embodiments of the present application, each of the first regions is provided with one of the opposite electrodes, and at least one of the second regions is provided with one of the opposite electrodes; and
wherein the opposite electrodes located on the plurality of first regions are all connected to the opposite electrodes located in the second regions.

Optionally, in some embodiments of the present application, each of the second regions is provided with one of the opposite electrodes, and at least one of the first regions is provided with one of the opposite electrodes; and
wherein the opposite electrodes located on the plurality of second regions are all connected to one or more of the opposite electrodes located in the first regions.

Optionally, in some embodiments of the present application, each of the first regions is provided with one of the opposite electrodes, each of the second regions is provided with one of the opposite electrodes, and the plurality of opposite electrodes are intersected to form a grid electrode.

Optionally, in some embodiments of the present application, the second substrate further includes an edge row region, the edge row region is defined at an outer edge of the plurality of pixel regions in a row direction, and the edge row region is provided with the opposite electrodes.

Optionally, in some embodiments of the present application, the second substrate further includes an edge column region, the edge column region is defined at an outer edge of the plurality of pixel regions in a column direction, and the edge column region is provided with the opposite electrodes.

Optionally, in some embodiments of the present application, the second substrate further includes an edge row region and an edge column region, the edge row region is defined at an outer edge of the plurality of pixel regions in a row direction, the edge row region is provided with the opposite electrodes; the edge column region is defined at the outer edge of the plurality of pixel regions in a column direction, and the edge column region is provided with the opposite electrodes.

Optionally, in some embodiments of the present application, the opposite electrodes and the pixel electrodes are insulated from each other.

Optionally, in some embodiments of the present application, pixel electrodes are disposed on the pixel regions, and the opposite electrodes and the pixel electrodes are disposed in different layers.

Optionally, in some embodiments of the present application, an insulating layer is disposed on the pixel electrodes, and the opposite electrodes are disposed on the insulating layer.

The present application also provides a liquid crystal display panel, which includes:
a first substrate;
a second substrate disposed opposite to the first substrate; and
a liquid crystal layer disposed between the first substrate and the second substrate,
wherein the first substrate includes a common electrode; the second substrate includes a plurality of first regions defined at intervals in a row direction, a plurality of second regions defined at intervals in a column direction, and a plurality of pixel regions defined by intersection of the plurality of the first regions and the plurality of the second regions; and the first regions and/or the second regions are provided with opposite electrodes, and the opposite electrodes are disposed opposite to and electrically connected to the common electrode.

Optionally, in some embodiments of the present application, pixel electrodes are disposed on the pixel regions, and the opposite electrodes and the pixel electrodes are disposed in a same layer.

Optionally, in some embodiments of the present application, each of the first regions is provided with one of the opposite electrodes, and at least one of the second regions is provided with one of the opposite electrodes; and
wherein the opposite electrodes located on the plurality of first regions are all connected to the opposite electrodes located in the second regions.

Optionally, in some embodiments of the present application, each of the second regions is provided with one of the opposite electrodes, and at least one of the first regions is provided with one of the opposite electrodes; and
wherein the opposite electrodes located on the plurality of second regions are all connected to one or more of the opposite electrodes located in the first regions.

Optionally, in some embodiments of the present application, each of the first regions is provided with one of the opposite electrodes, each of the second regions is provided with one of the opposite electrodes, and the plurality of opposite electrodes are intersected to form a grid electrode.

Optionally, in some embodiments of the present application, the second substrate further includes an edge row region, the edge row region is defined at an outer edge of the plurality of pixel regions in a row direction, and the edge row region is provided with the opposite electrodes.

Optionally, in some embodiments of the present application, the second substrate further includes an edge column region, the edge column region is defined at an outer edge of the plurality of pixel regions in a column direction, and the edge column region is provided with the opposite electrodes.

Optionally, in some embodiments of the present application, the second substrate further includes an edge row region and an edge column region, the edge row region is defined at an outer edge of the plurality of pixel regions in a row direction, the edge row region is provided with the opposite electrodes; the edge column region is defined at the outer edge of the plurality of pixel regions in a column direction, and the edge column region is provided with the opposite electrodes.

Optionally, in some embodiments of the present application, the opposite electrodes and the pixel electrodes are insulated from each other.

In the liquid crystal display panel of the present application, opposite electrodes arranged opposite to a common electrode are disposed at first regions and/or second regions, and then an electric field is generated between the opposite electrodes and the common electrode, so that there is no vertical electric field between the first regions and the common electrode and/or between the second regions and the common electrode, the liquid crystal molecules located in the first regions and/or the second regions are always in a stationary state to form a retaining wall. Intermolecular interaction can make adjacent liquid crystal molecules that have been deflected quickly restore to their initial state, thereby improving response times of the liquid crystal molecules and reducing delay.

BRIEF DESCRIPTION OF DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
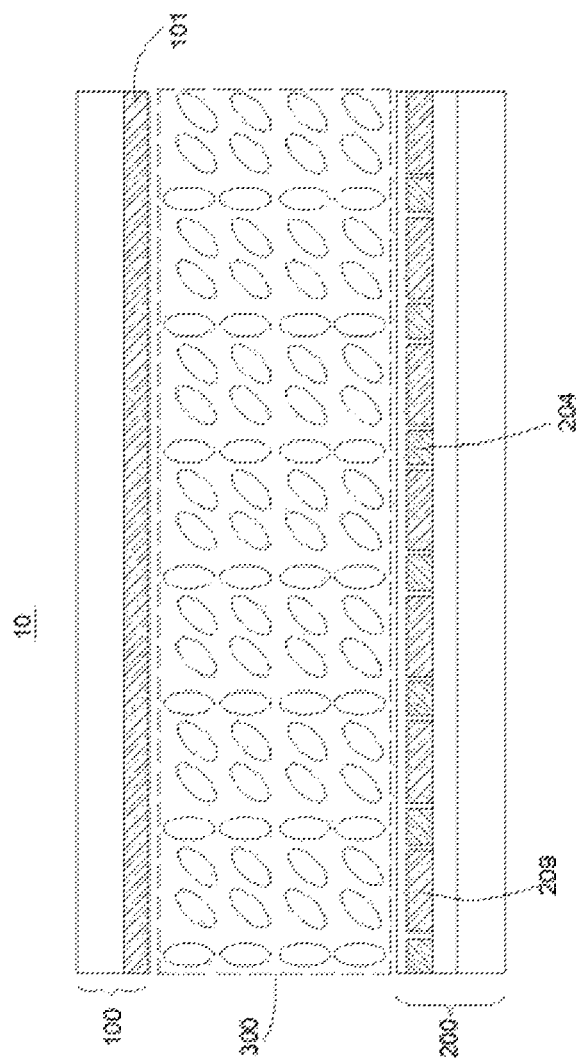
FIG. 1 is a schematic diagram of a first structure of a liquid crystal display panel provided by the present application.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

The present application provides a liquid crystal display panel, wherein the liquid crystal display panel includes: a first substrate; a second substrate disposed opposite to the first substrate; and a liquid crystal layer disposed between the first substrate and the second substrate, wherein the first substrate includes a common electrode; the second substrate includes a plurality of first regions defined at intervals in a row direction, a plurality of second regions defined at intervals in a column direction, and a plurality of pixel regions defined by intersection of the plurality of the first regions and the plurality of the second regions; the first regions and/or the second regions are provided with opposite electrodes, and the opposite electrodes are disposed opposite to and electrically connected to the common electrode. Detailed descriptions are given below. It should be noted that the order of description in the following embodiments is not intended to limit the preferred order of the embodiments.

Figure 2:
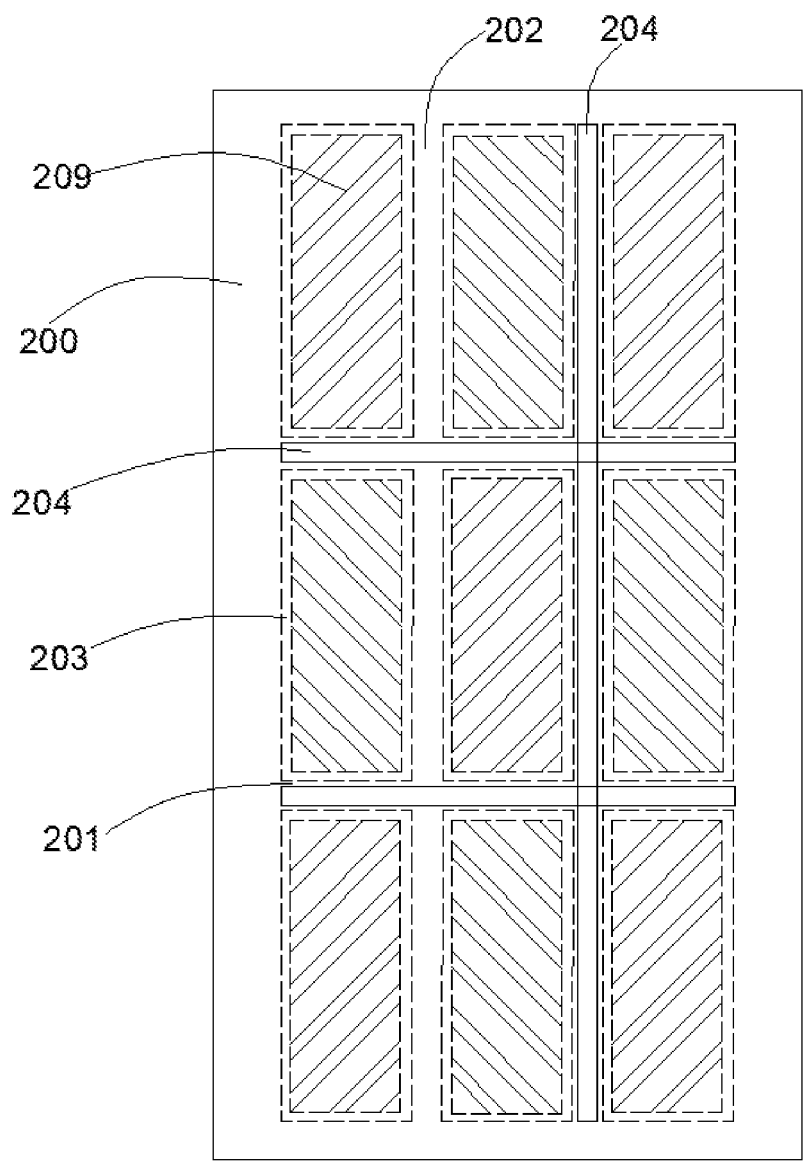
FIG. 2 is a schematic cross-sectional view of the opposite electrodes of the first structure of the liquid crystal display panel provided by the present application.

Referring to FIGS. 1 to 2, FIG. 1 is a schematic diagram of a first structure of a liquid crystal display panel provided by the present application, and FIG. 2 is a schematic cross-sectional view of opposite electrodes of the first structure of the liquid crystal display panel provided by the present application. The present application provides a liquid crystal display panel 10, which includes a first substrate 100, a second substrate 200, and a liquid crystal layer 300.

The first substrate 100 and the second substrate 200 are disposed opposite to each other, and the liquid crystal layer 300 is disposed between the first substrate 100 and the second substrate 200.

In addition, the first substrate 100 includes a common electrode 101, and the second substrate 200 includes a plurality of first regions 201 arranged at intervals in a row direction, a plurality of second regions 202 arranged at intervals in a column direction, and a plurality of pixel regions 203 defined by intersection of the plurality of the first regions 201 and the plurality of the second regions 202. The first regions 201 and/or the second regions 202 are provided with opposite electrodes 204, and the opposite electrodes 204 are disposed opposite to and electrically connected to the common electrode 101.

In some embodiments, the first substrate 100 may be a color filter substrate, and the second substrate 200 may be an array substrate. The liquid crystal layer 300 may include a plurality of liquid crystal molecules. The common electrode is generally made of a transparent material, such as indium tin oxide (ITO).

In the present application, opposite electrodes arranged opposite to a common electrode are disposed at first regions and/or second regions, and then an electric field is generated between the opposite electrodes and the common electrode, so that there is no vertical electric field between the first regions and the common electrode and/or between the second regions and the common electrode, the liquid crystal molecules located in the first regions and/or the second regions are always in a stationary state to form a retaining wall. Intermolecular interaction can make adjacent liquid crystal molecules that have been deflected quickly restore to their initial state, thereby improving response times of the liquid crystal molecules and reducing delay.

Further, in some embodiments, the opposite electrodes 202 and the common electrode 101 have the same electric potential. For example, a potential of the common electrode is 7v, and a potential of the opposite electrodes is also 7v. According to the inventor's research, by setting the potential of the opposite electrodes to be the same as the potential of the common electrode, optimal response times of the liquid crystal molecules can be obtained.

Figure 3:
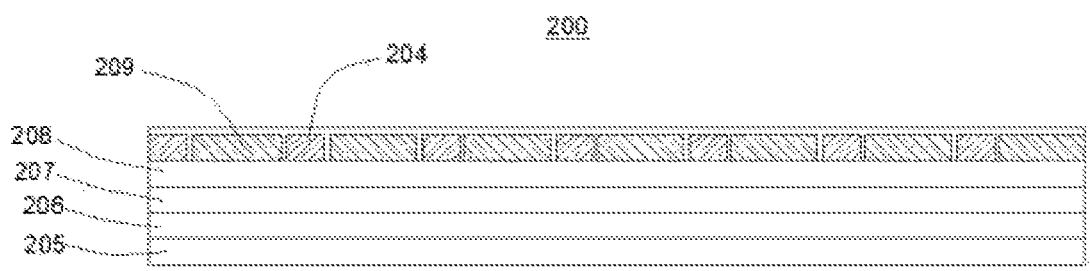
FIG. 3 is a schematic diagram of the second substrate of the first structure of the liquid crystal display panel provided by the present application.

In some embodiments, the pixel regions 203 are provided with pixel electrodes 209, and the opposite electrodes 204 and the pixel electrodes 209 are provided in the same layer. Specifically, referring to FIG. 3, FIG. 3 is a schematic diagram of the second substrate of the first structure of the liquid crystal display panel provided by the present application. In some embodiments, the second substrate 200 further includes: a base substrate 205, a buffer layer 206, a thin film transistor layer 207, a planarization layer 208, and pixel electrodes 209.

The buffer layer 206 is disposed on the base substrate 205.

The thin film transistor layer 207 is disposed on the buffer layer 206.

The planarization layer 208 is disposed on the thin film transistor layer 207.

The pixel electrodes 209 and the opposite electrodes 204 are both disposed on the planarization layer 208, and the pixel electrodes 209 are insulated and spaced apart from the opposite electrodes 204. That is, the opposite electrodes are insulated from the pixel electrodes.

The base substrate 205 may be a base substrate made of a flexible material, for example, a base substrate made of polyimide. The base substrate 205 may also be a rigid base substrate, for example, a base substrate made of a rigid material such as glass. It should be noted that the thin film transistor layer 207 may include an active layer, a gate layer, a gate insulating layer, a source-drain metal layer, and the like.

By arranging the pixel electrodes and the opposite electrodes in the same layer and both on the planarization layer, a number of photoresist layers can be reduced, and the pixel electrodes and the opposite electrodes can be processed with one photoresist layer, which is beneficial to reduce the cost.

In this embodiment, the opposite electrodes 204 includes strip electrodes. The strip electrodes are easy to dispose.

Referring to FIG. 2, FIG. 2 is a schematic cross-sectional view of the opposing electrodes of the first structure of the liquid crystal display panel provided by the present application. Each of the first regions 201 is provided with one of the opposing electrodes 204, and at least one of the second region 202 is provided with one of the opposite electrodes 204; wherein the opposite electrodes 204 located on the plurality of first regions 201 are all connected to the opposite electrodes 204 located in the second regions 202. In this embodiment, each of the first regions is provided with one of the opposing electrodes, so that the liquid crystal molecules located on all the first regions along the row direction are always in a stationary state to form a retaining wall, to maximize response times of the liquid crystal molecules in adjacent regions between the pixel regions along the row direction. Meanwhile, at least one of the second regions is provided with one of the opposite electrodes, so that the liquid crystal molecules located on the at least one second regions are always in a stationary state to form a retaining wall, which further improves the response times of the liquid crystal molecules.

Figure 4:
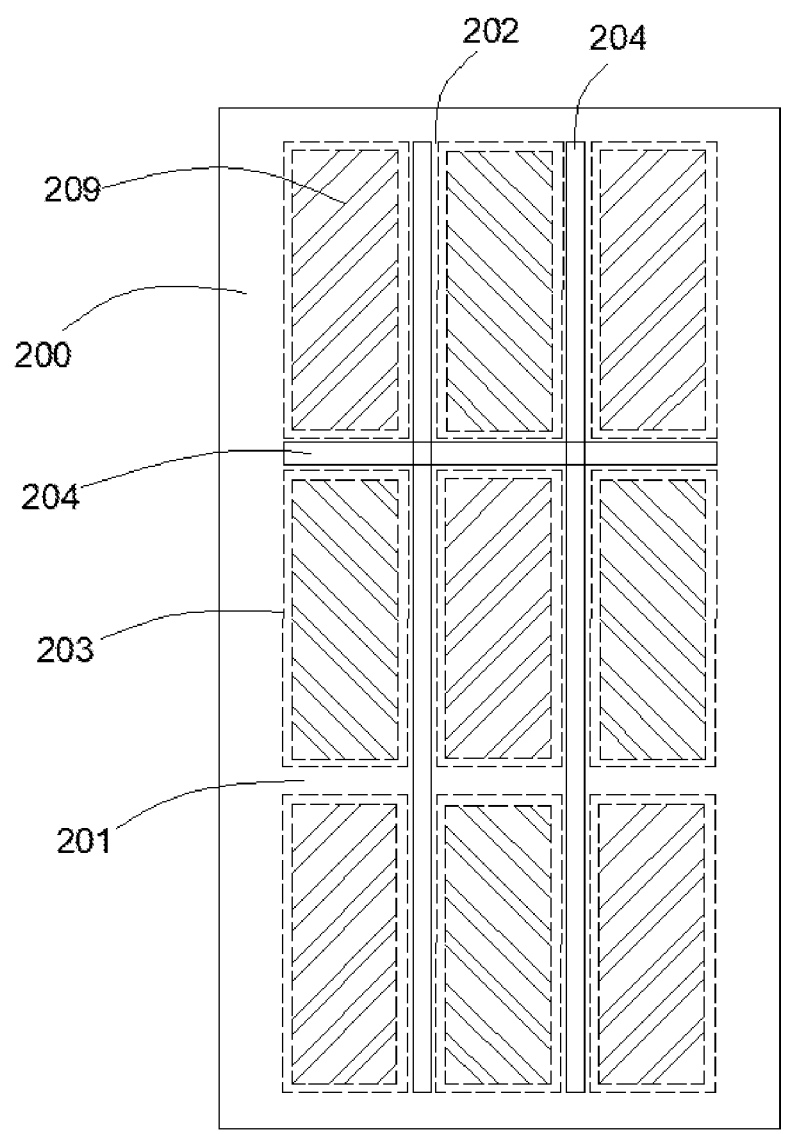
FIG. 4 is a schematic cross-sectional view of the opposite electrodes of a second structure of the liquid crystal display panel provided by the present application.

Referring to FIG. 4, FIG. 4 is a schematic cross-sectional view of the opposite electrodes of the second structure of the liquid crystal display panel provided by the present application. The difference from the liquid crystal display panel provided in FIG. 2 is that each of the second regions 202 is provided with one of the opposite electrodes 204, and at least one of the first regions 201 is provided with one of the opposite electrodes 204; wherein the opposite electrodes 204 located on the plurality of second regions 202 are all connected to the opposite electrodes 204 located on the first region 201. In this embodiment, each of the second regions is provided with one of the opposite electrodes, so that the liquid crystal molecules located on all the second regions along the r column direction are always in a stationary state to form a retaining wall, to maximize response times of the liquid crystal molecules in adjacent regions between the pixel regions along the column direction. Meanwhile, at least one of the first regions is provided with one of the opposite electrodes, so that the liquid crystal molecules located on the at least one first regions are always in a stationary state to form a retaining wall, which further improves the response times of the liquid crystal molecules.

Figure 5:
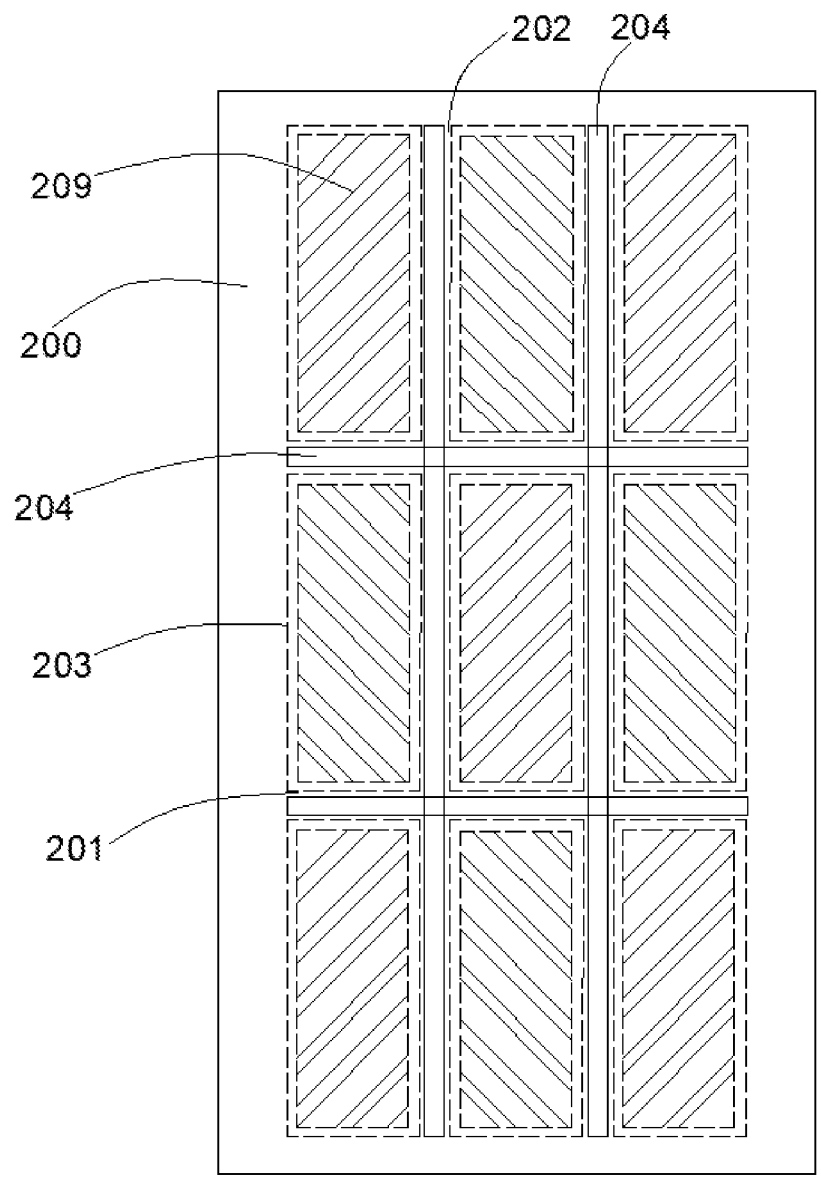
FIG. 5 is a schematic cross-sectional view of the opposite electrodes of a third structure of the liquid crystal display panel provided by the present application.

Referring to FIG. 5, FIG. 5 is a schematic cross-sectional view of the opposite electrodes of a third structure of the liquid crystal display panel provided by the present application. The difference from the liquid crystal display panel provided in FIG. 2 is that each of the first regions 201 is provided with one of the opposite electrodes 204, each of the second regions 202 is provided with one of the opposite electrodes 204, and the plurality of opposite electrodes 20 are intersected to form a grid electrode. That is, in this embodiment, by providing opposing electrodes on all the second regions along the column direction and all the first regions along the row direction, the liquid crystal molecules on all the second regions along the column direction and all the first regions along the row direction are always in a stationary state to form a retaining wall, to maximize response times of the liquid crystal molecules in adjacent regions between the pixel regions, so that the liquid crystal display panel can provide a better display effect.

Figure 6:
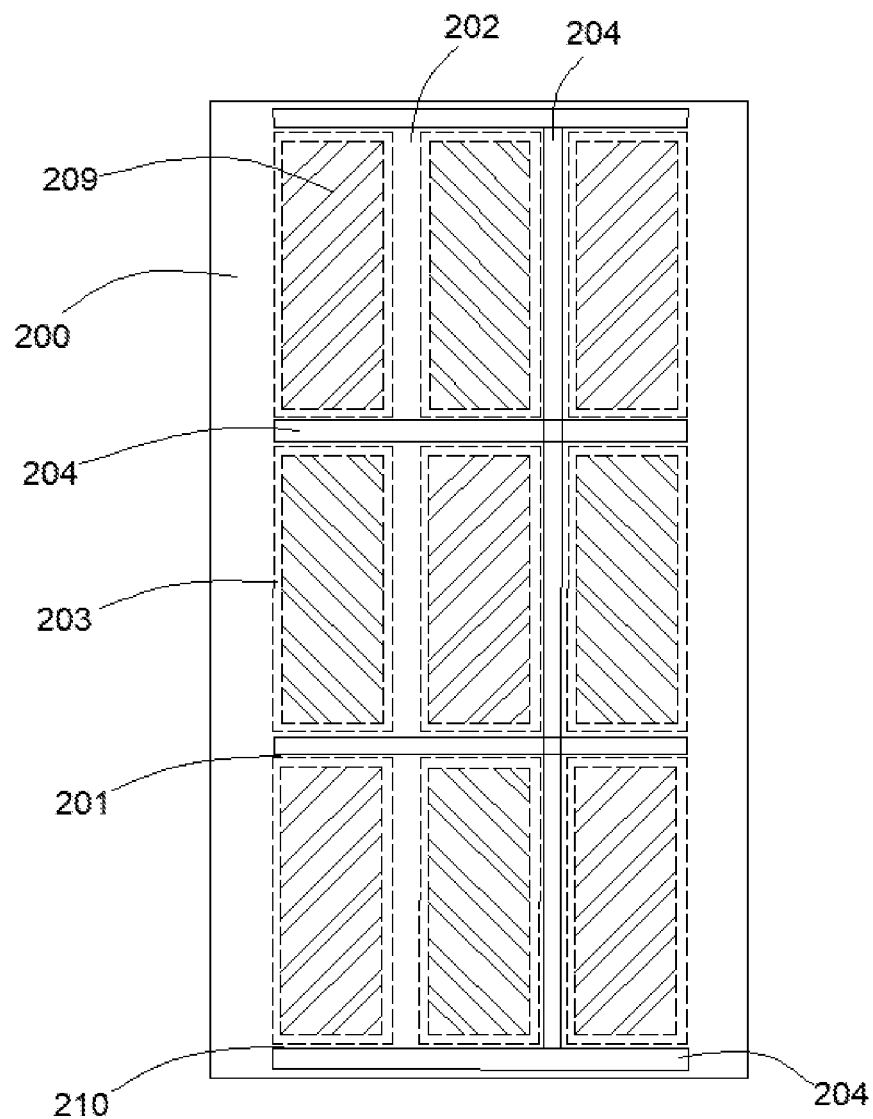
FIG. 6 is a schematic cross-sectional view of the opposing electrode of a fourth structure of the liquid crystal display panel provided by the present application.

Referring to FIG. 6, FIG. 6 is a schematic cross-sectional view of the opposing electrodes of a fourth structure of the liquid crystal display panel provided by the present application. The difference from the liquid crystal display panel provided in FIG. 2 is that the second substrate 200 further includes an edge row region 210, the edge row region 210 is defined at an outer edge of the plurality of pixel regions 203 in a row direction, and the edge row region 210 is provided with the opposite electrodes 204. The opposite electrodes 204 located in the edge row region 210 are connected to the opposite electrodes 204 located in the second regions 202. By providing opposite electrodes in the edge row region, the liquid crystal molecules located in the edge row region can always be in a stationary state to form a retaining wall, thereby improving the response times of the liquid crystal molecules located at the outer edges of the plurality of pixel regions along the row direction, so that the liquid crystal display panel can provide a better display effect.

Figure 7:
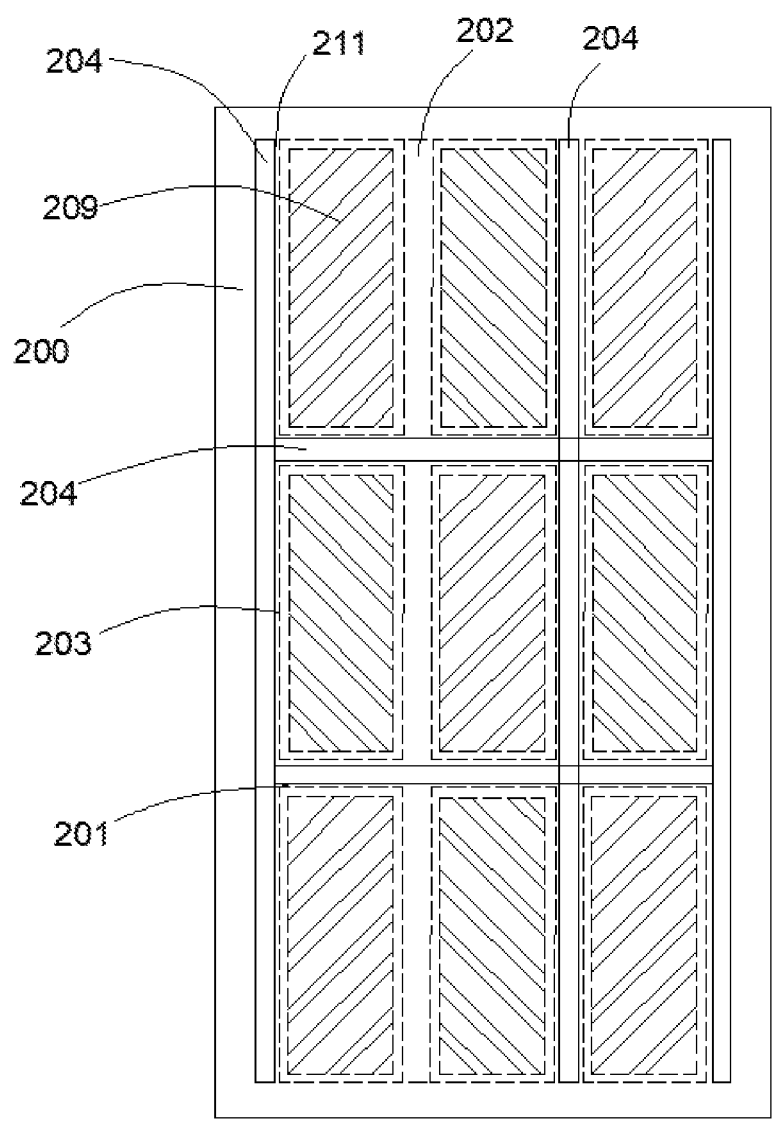
FIG. 7 is a schematic cross-sectional view of the opposing electrode of a fifth structure of the liquid crystal display panel provided by the present application.

Referring to FIG. 7, FIG. 7 is a schematic cross-sectional view of the opposing electrodes of a fifth structure of the liquid crystal display panel provided by the present application. The difference from the liquid crystal display panel provided in FIG. 2 is that the second substrate 200 further includes an edge column region 211, the edge column region 211 is defined at an outer edge of the plurality of pixel regions 203 in a column direction, and the edge column region 211 is provided with the opposite electrodes 204. The opposite electrodes 204 located in the edge column region 211 are connected to the opposite electrodes 204 located in the first regions 201. By providing opposite electrodes in the edge column region, the liquid crystal molecules located in the edge column region can always be in a stationary state to form a retaining wall, thereby improving the response times of the liquid crystal molecules located at the outer edges of the plurality of pixel regions along the column direction, so that the liquid crystal display panel can provide a better display effect.

Figure 8:
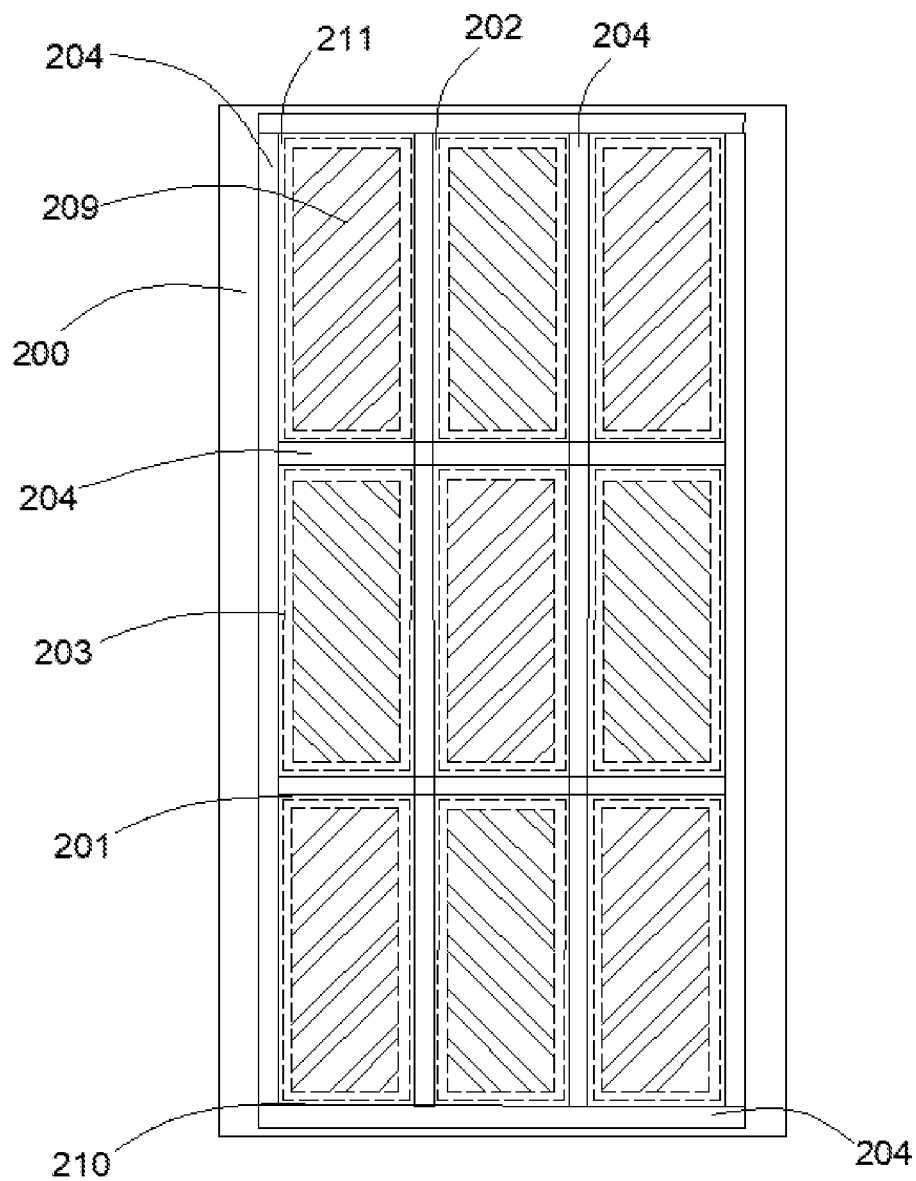
FIG. 8 is a schematic cross-sectional view of the opposite electrodes of a sixth structure of the liquid crystal display panel provided by the present application.

Referring to FIG. 8, FIG. 8 is a schematic cross-sectional view of the opposite electrodes of a sixth structure of the liquid crystal display panel provided by the present application. The difference from the liquid crystal display panel provided in FIG. 2 is that the second substrate further includes an edge row region 210 and an edge column region 211, the edge row region 210 is provided at the outer edge of the plurality of pixel regions 203 along the row direction, and the edge row region 210 is provided with the opposite electrodes 204. The edge column region 211 is provided at the outer edge of the plurality of pixel regions 203 along the column direction, and the edge column region 211 is provided with the opposite electrodes 204. The opposite electrodes 204 located in the edge row region 210 are connected to the opposite electrodes 204 located in the second regions 202, and the opposite electrodes 204 located in the edge column region 211 are connected to the opposite electrodes 204 located in the first regions 201. By providing opposite electrodes in both the edge column region and the edge row region, the liquid crystal molecules located in the edge column region and the edge row region can always be in a stationary state to form a retaining wall, thereby improving the response times of the liquid crystal molecules located at the outer edges of the plurality of pixel regions along the column direction and the row direction, so that the liquid crystal display panel can provide a better display effect.

Figure 9:
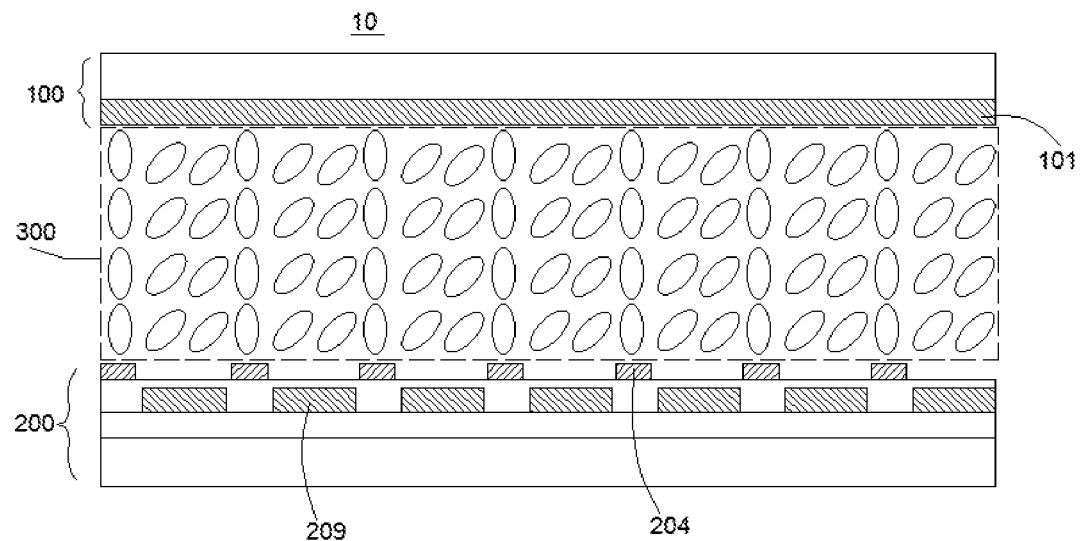
FIG. 9 is a schematic diagram of a seventh structure of the liquid crystal display panel provided by the present application.
Figure 10:
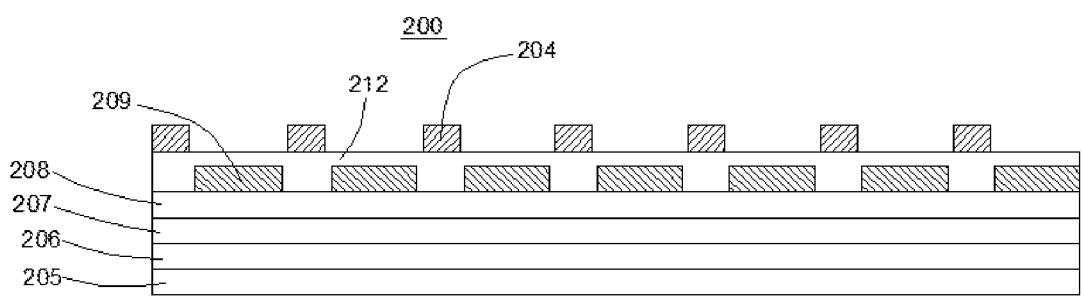
FIG. 10 is a schematic diagram of the second substrate of the seventh structure of the liquid crystal display panel provided by the present application.

Referring to FIG. 9 and FIG. 10 in conjunction, FIG. 9 is a schematic diagram of a seventh structure of the liquid crystal display panel provided by the present application; and FIG. 10 is a schematic diagram of the second substrate of the seventh structure of the liquid crystal display panel provided by the present application. The difference from the first structure of the liquid crystal display panel shown in FIG. 1 and FIG. 3 is that the pixel regions 203 is provided with the pixel electrodes 209, the opposite electrodes 204 and the pixel electrodes 209 are arranged in different layers, and an insulating layer 212 is disposed on the pixel electrodes 209, and the opposite electrodes 204 are disposed on the insulating layer 212. Specifically, in some embodiments, the second substrate 200 includes: a base substrate 205, a buffer layer 206, a thin film transistor layer 207, a planarization layer 208, the pixel electrodes 209, and the insulating layer 212; the buffer layer 206 is disposed on the base substrate 205; the thin film transistor layer 207 is disposed on the buffer layer 206; the planarization layer 208 is disposed on the thin film transistor layer 207; the pixel electrodes 209 are located in the pixel regions 203; the pixel electrodes 209 are disposed on the planarization layer 208;

the insulating layer 212 is disposed on the pixel electrodes 209; and the opposite electrodes 204 are disposed on the insulating layer 212.

In this embodiment, the pixel electrodes and the opposite electrodes are arranged in different layers, and the insulating layer is arranged between the pixel electrodes and the opposite electrodes, which can improve insulation between the pixel electrodes and the opposite electrodes. Meanwhile, the opposite electrodes can have a larger installation space because they are arranged in different layers, and projections of the opposite electrodes in a direction perpendicular to the pixel electrodes do not need to have an insulating gap with the pixel electrodes, which can further increase the installation space of the opposite electrodes. As a result, the retaining wall on a common boundary of adjacent ones of the pixel regions has a larger area, which is beneficial to improve the response times of the liquid crystal molecules.

The liquid crystal display panel provided by the embodiments of the present application is described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A liquid crystal display panel, comprising:
   a first substrate;
   a second substrate disposed opposite to the first substrate; and
   a liquid crystal layer disposed between the first substrate and the second substrate and containing liquid crystal molecules,
   wherein the first substrate comprises a common electrode; the second substrate comprises a plurality of first regions defined at intervals in a row direction, a plurality of second regions defined at intervals in a column direction, and a plurality of pixel regions defined by intersection of the plurality of the first regions and the plurality of the second regions; the first regions and/or the second regions are provided with opposite electrodes, and the opposite electrodes are disposed opposite to and electrically connected to the common electrode;
   wherein no vertical electric field is formed between the opposite electrodes in the first regions and/or the second regions and the common electrode, so that in an off state and a driving state, the liquid crystal molecules located in a position corresponding to the first regions and/or the second regions are always in a vertical state, while the liquid crystal molecules located in another position corresponding to the pixel regions are switched between the vertical state and a deflected state,
   wherein pixel electrodes are disposed on the pixel regions, and the opposite electrodes and the pixel electrodes are disposed in different layers, and
   wherein the first substrate is a color filter substrate, and the second substrate is an array substrate.

2. The liquid crystal display panel according to claim 1, wherein each of the first regions is provided with one of the opposite electrodes, and at least one of the second regions is provided with one of the opposite electrodes; and wherein the opposite electrodes located on the plurality of first regions are all connected to the opposite electrodes located on the second regions.

3. The liquid crystal display panel according to claim 1, wherein each of the second regions is provided with one of the opposite electrodes, and at least one of the first regions is provided with one of the opposite electrodes; and
   wherein the opposite electrodes located on the plurality of second regions are all connected to one or more of the opposite electrodes located on the first regions.

4. The liquid crystal display panel according to claim 1, wherein each of the first regions is provided with one of the opposite electrodes, each of the second regions is provided with one of the opposite electrodes, and the plurality of opposite electrodes are intersected to form a grid electrode.

5. The liquid crystal display panel according to claim 2, wherein the second substrate further comprises an edge row region, the edge row region is defined at an outer edge of the plurality of pixel regions in a row direction, and the edge row region is provided with the opposite electrodes.

6. The liquid crystal display panel according to claim 2, wherein the second substrate further comprises an edge column region, the edge column region is defined at an outer edge of the plurality of pixel regions in a column direction, and the edge column region is provided with the opposite electrodes.

7. The liquid crystal display panel according to claim 2, wherein the second substrate further comprises an edge row region and an edge column region, the edge row region is defined at an outer edge of the plurality of pixel regions in a row direction, the edge row region is provided with the opposite electrodes; the edge column region is defined at the outer edge of the plurality of pixel regions in a column direction, and the edge column region is provided with the opposite electrodes.

8. The liquid crystal display panel according to claim 1, wherein the opposite electrodes and the pixel electrodes are insulated from each other.

9. The liquid crystal display panel according to claim 1, wherein an insulating layer is disposed on the pixel electrodes, and the opposite electrodes are disposed on the insulating layer.

10. A liquid crystal display panel, comprising:
    a first substrate;
    a second substrate disposed opposite to the first substrate; and
    a liquid crystal layer disposed between the first substrate and the second substrate,
    wherein the first substrate comprises a common electrode; the second substrate comprises a plurality of first regions defined at intervals in a row direction, a plurality of second regions defined at intervals in a column direction, and a plurality of pixel regions defined by intersection of the plurality of the first regions and the plurality of the second regions; and the first regions and/or the second regions are provided with opposite electrodes, and the opposite electrodes are disposed opposite to and electrically connected to the common electrode,
    no vertical electric field is formed between the opposite electrodes in the first regions and/or the second regions and the common electrode, so that in an off state and a driving state, the liquid crystal molecules located in a position corresponding to the first regions and/or the second regions are always in a vertical state, while the liquid crystal molecules located in another position corresponding to the pixel regions are switched between the vertical state and a deflected state, and pixel electrodes are disposed on the pixel regions, and the opposite electrodes and the pixel electrodes are disposed in different layers.

11. The liquid crystal display panel according to claim 10, wherein each of the first regions is provided with one of the opposite electrodes, and at least one of the second regions is provided with one of the opposite electrodes; and wherein the opposite electrodes located on the plurality of first regions are all connected to the opposite electrodes located on the second regions.

12. The liquid crystal display panel according to claim 10, wherein each of the second regions is provided with one of the opposite electrodes, and at least one of the first regions is provided with one of the opposite electrodes; and wherein the opposite electrodes located on the plurality of second regions are all connected to one or more of the opposite electrodes located on the first regions.

13. The liquid crystal display panel according to claim 10, wherein each of the first regions is provided with one of the opposite electrodes, each of the second regions is provided with one of the opposite electrodes, and the plurality of opposite electrodes are intersected to form a grid electrode.

14. The liquid crystal display panel according to claim 11, wherein the second substrate further comprises an edge row region, the edge row region is defined at an outer edge of the plurality of pixel regions in a row direction, and the edge row region is provided with the opposite electrodes.

15. The liquid crystal display panel according to claim 11, wherein the second substrate further comprises an edge column region, the edge column region is defined at an outer edge of the plurality of pixel regions in a column direction, and the edge column region is provided with the opposite electrodes.

16. The liquid crystal display panel according to claim 11, wherein the second substrate further comprises an edge row region and an edge column region, the edge row region is defined at an outer edge of the plurality of pixel regions in a row direction, the edge row region is provided with the opposite electrodes; the edge column region is defined at the outer edge of the plurality of pixel regions in a column direction, and the edge column region is provided with the opposite electrodes.

\* \* \* \* \*